July 20, 1965 E. J. HOPKINS 3,196,290

TRANSISTOR LOGIC CIRCUIT

Filed March 8, 1963 2 Sheets-Sheet 1

INVENTOR:
ERNEST J. HOPKINS,
BY Albert S. Richardson Jr.
ATTORNEY.

INVENTOR:
ERNEST J. HOPKINS,
BY Albert S. Richardson Jr.
ATTORNEY

United States Patent Office 3,196,290
Patented July 20, 1965

3,196,290
TRANSISTOR LOGIC CIRCUIT

Ernest J. Hopkins, Clearwater, Fla., assignor to General Electric Company, a corporation of New York Filed Mar. 8, 1963, Ser. No. 263,970
4 Claims. (Cl. 307—88.5)

This invention relates to electric control means, and more particularly it relates to a transistor logic circuit capable of developing dependent output control signals in preselected response to two different combinations of three separate input signals.

A general object of the invention is to provide an improved arrangement of transistors or the like for producing a first output signal in controlled response to first and second input signals and for producing a second output signal in controlled response to the first and second input signals plus a third input signal.

A more specific object of my invention is the provision of a transistor logic circuit especially well suited for carrying out the dual roles of performing a supervised coincidence detecting function and, at the same time, of keying a frequency checking function in a highly sensitive and fast acting protective relaying system such as that which is the subject matter of a copending patent application S.N. 249,791 filed on January 7, 1963, for Charles A. Mathews assigned to the assignee of the present application.

In carrying out my invention in one form, I arrange a plurality of transistors to form two interconnected control means. The first control means includes two transistors in tandem, and it operates only when both transistors are concurrently activated. One of said transistors is activated in response to energization by a first input comprising a continuous supervising voltage, while the other transistor is arranged for activation when energized by a second input comprising a periodic operating voltage of predetermined polarity, said activation occurring in response to operating voltage of very low magnitude. The first control means when in operation will produce a first output voltage of the same polarity as the operating voltage, and since the duration of this output voltage depends on the period of the operating voltage, it may be utilized to key a frequency checking circuit in the manner taught by Mathews in the above-cited copending patent application. The second control means, including still another transistor which is arranged for activation when energized by a third input comprising a periodic reference voltage of said predetermined polarity (said activation occurring in response to reference voltage of very low magnitude), is so arranged as to produce a second output voltage, of the same polarity, in response to operation of the first control means and concurrent activation of the latter transistor. The second output voltage is therefore produced only while both of said operating and reference voltages are coincidently subsisting, and it consequently provides a measure of the phase relationship between these two voltages.

My invention will be better understood and its various objects and advantages will be more fully appreciated from the following description taken in conjunction with the accompanying drawings in which.

Figure 1:
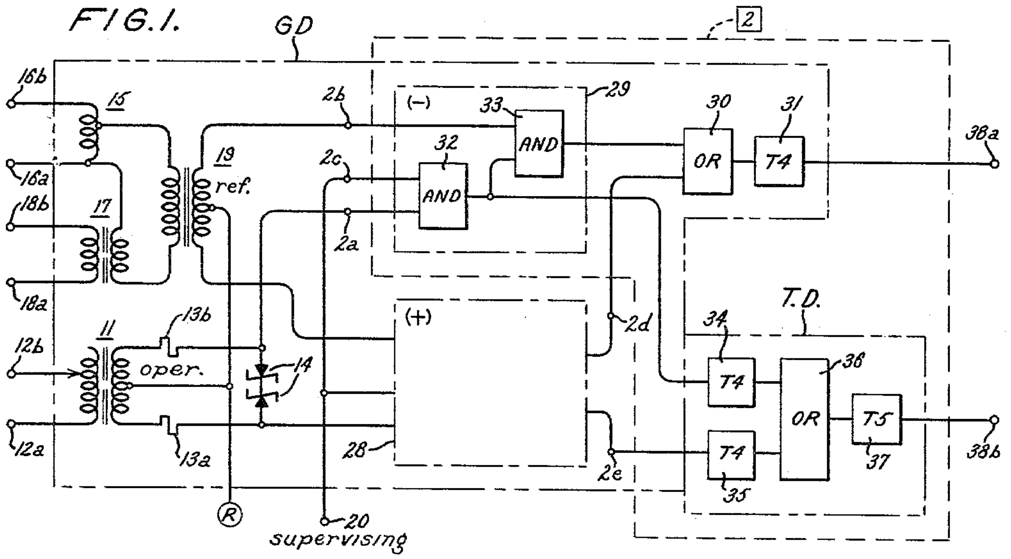
FIG. 1 is a schematic showing, mostly in block form, of a protective relaying arrangement embodying my invention.

Referring now to FIG. 1, I have shown schematically, for the purpose of illustrating a preferred embodiment of my invention, a protective relaying arrangement comprising a directional sensing or discriminating means GD in combination with time delay means T.D. This particular setting of my invention is useful in a ground current directional-comparison protective relaying system such as that which is the subject matter of the above-cited copending application S.N. 249,791, Mathews.

As is more fully explained in the copending application, the presently illustrated arrangement is supplied with an A.-C. operating quantity taken from the residual circuit of star-connected instrument current transformers, the operating quantity therefore being representative of the zero-phase-sequence component of current flowing in an electric power transmission line to be protected. The arrangement is also supplied with two A.-C. polarizing quantities representative, respectively, of the zero-phase-sequence component of line voltage and the neutral current of a grounding transformer bank. The directional sensing means GD is designed to operate only if the phase relationship between the operating quantity and a polarizing quantity is such as to indicate that ground current in the protected line is flowing in a given direction. The T.D. component of the FIG. 1 arrangement operates if the operating quantity supplied to GD is oscillating at lower than a predetermined frequency.

As is shown in FIG. 1, the directional sensing means GD includes a "transactor" 11 connected to terminals 12*a* and 12*b* which are energized by the operating quantity. A transactor is a known device having electrical characteristics similar in some respects to a conventional transformer and similar in other respects to a reactor. In effect it is an air-gap reactor having associated therewith primary and secondary windings, with a load circuit being connected to the secondary winding. The voltage derived across the secondary winding of the transactor 11 is accurately representative, both in magnitude and phase, of the A.-C. current (below a predetermined limited level) flowing in its primary winding. Its primary current is derived from the zero-phase-sequence component of transmission line current.

The secondary winding of transactor 11 is tapped midway between its opposite ends, and this midtap is connected to a common reference bus (identified by the encircled letter R) of a suitable source of D.-C. supply voltage. The secondary circuit also includes a pair of resistors 13*a* and 13*b*, connected respectively to opposite ends of the scondary winding, and a voltage limiter 14 (comprising a pair of back-to-back zener diodes) connected in shunt therewith. The limiter 14 is selected so as to remain in a high impedance state at the relatively low levels of voltage to which the succeeding circuits respond, and preferably it is effective to limit voltage to a 100-volt maximum or peak magnitude. It is apparent therefore that the transactor 11 provides the succeeding circuits with an operating signal comprising a succession of voltage impulses of duration and polarity representative of successive half cycles of the operating quantity applied to terminals 12*a* and 12*b*.

The directional sensing means GD also includes a tapped autotransformer 15 connected across terminals 16*a* and 16*b* which are energized from the source of voltage polarization. Hence the autotransformer 15 provides A.-C. voltage proportional to zero-phase-sequence line voltage. Another transactor 17 is connected to terminals 18*a* and 18*b* which are energized from the source of current polarization, whereby transactor 17 derives an A.-C. secondary voltage having a fixed phase relationship to this polarizing quantity. The autotransformer 15 and the secondary winding of transactor 17 are interconnected as shown in FIG. 1, and transforming means 19 is provided to transform the resulting combination of their respective voltages. The secondary winding of the transforming means 19, which is connected to the reference bus R midway between its opposite ends, provides the succeeding circuits with a reference signal comprising a succession of voltage impulses of duration and polarity representative of successive half cycles of the combined polarizing quantity.

In order to respond to the direction of the zero-phase-sequence line current from which the operating signal is derived, the ground sensing means GD includes (1) discriminating means 28, 29, 30 for providing a measure of the phase relationship between the operating and reference signals, and (2) measuring means 31 for effecting operation of GD whenever this measure indicates that the zero-phase-sequence line current is flowing in the given direction. More specifically, the discriminating means to which the aforesaid operating and reference signals are applied, is arranged when operative to develop a train of substantially constant magnitude unipolarity resultant voltage impulses having periods of duration coinciding to the periods during which the operating signal overlaps a reference signal of like polarity, and the measuring means 31 operatively responds to the persistance of any resultant impulse longer than the duration of approximately one-quarter of a power frequency cycle (e.g. 4 milliseconds in a 60 c.p.s. power system). Whenever zero-phase-sequence line current (from which the operating signal is derived) is flowing in the given direction, it is substantially in phase with a polarizing quantity (from which the reference signal is derived), while these quantities are essentially 180 degrees out of phase whenever zero-phase-sequence line current is flowing in the opposite direction. Consequently the measuring means 31 is caused to operate only in the former circumstance.

In the illustrated embodiment of the directional sensing means GD, the discriminating means comprises identical coincidence circuits 28 and 29, but these circuits are arranged for alternative response during the "positive" and "negative" half cycles, respectively, of the signals supplied thereto. This result obtains because, as can be seen in FIG. 1, the lower end of the secondary winding of transactor 11 is connected to the coincidence circuit 28 while the upper end of this winding is connected via an input terminal 2*a* to the companion circuit 29, and the lower end of the secondary winding of transforming means 19 is connected to the coincidence circuit 28 while the upper end of this winding is connected via another input terminal 2*b* to the circuit 29. Coincidence circuit 28 then serves to produce a resultant voltage impulse during that portion of every power-frequency cycle when the lower ends of the two windings, relative to their upper ends, respectively, are simultaneously positive, while the coincidence circuit 29 serves to produce a resultant voltage impulse during a different portion of the same cycle when the lower ends are simultaneously negative.

As is shown in FIG. 1, the coincidence circuits 28 and 29 of GD are also connected to a terminal 20. The terminal 20 is adapted to be energized by a predetermined supervising signal comprising a continuous D.-C. voltage of positive polarity with respect to the reference bus R. The presence of this supervising signal is required to render the coincidence circuits operative.

The coincidence circuit 29 is illustrated by logic symbols in FIG. 1. (This circuit, together with the succeeding components which have been encompassed in FIG. 1 by dash-line 2, is shown in still greater detail in FIG. 2, soon to be described.) The operating signal which is applied to terminal 2*a* and the supervising signal, which is supplied by terminal 20 via still another input terminal 2*c*, provide, respectively, two different inputs for an AND logic unit 32. The AND block 32 represents a circuit or unit whose output signal is "on" only when both of the identified inputs are concurrently on. The respective inputs are "on" whenever terminals 2*a* and 2*c* are energized by voltages of given polarity (positive with respect to the reference bus R), and in view of this the input terminal 2*a* may be considered energized by a periodic operating voltage comprising unipolarity half cycles corresponding to alternate half cycles of the operating signal. Thus the unit 32 operates (turns on) periodically under the control of the operating voltage, so long as a supervising signal is concurrently present.

As is shown in FIG. 1, the output of the AND unit 32 supplies an input signal for another AND logic unit 33 of the coincidence circuit 29, and it also feeds a measuring component 34 of the time delay means T.D. Since the duration of the output produced by unit 32 coincides to the duration of the half cycles comprising the periodic operating voltage energizing the input terminal 2*a*, this output provides a measure of the period of the operating voltage.

The AND unit 33 is provided with a second input by the reference signal which is applied to terminal 2*b*, and this input is "on" whenever the reference signal is of the aforesaid given polarity (positive with respect to the reference bus). Thus the input terminal 2*b* may be considered energized by a periodic reference voltage comprising unipolarity half cycles corresponding to alternate half cycles of the reference signal, and the AND unit 33 is operative to produce a succession of resultant output signals each having a duration corresponding to that portion of a power-frequency cycle during which the AND unit 32 is on and a reference voltage concurrently subsists. The output of the AND unit 33 serves as an input for an OR logic unit 30.

The OR block 30 represents a circuit which is in an operative state (its output is "on") whenever either (or both) of two alternative inputs is "on." The second input for unit 30 is taken from a terminal 2*d* which is energized by a succession of resultant output signals produced by the coincidence circuit 28. The latter signals alternate with those produced by the AND unit 33 of circuit 29. Thus it is apparent that the output of the OR unit 30 comprises a train of resultant signals or impulses having periods of duration dependent upon the periods of polarity coincidence between the operating and reference A.-C. signals during successive half cycles thereof. This output is used to energize the measuring means 31, shown in FIG. 1 as a block labeled "T4."

The measuring means or component 31 comprises a time delay pickup and dropout circuit such as that which is shown and described in detail in the aforesaid copending Mathews application (see FIGURE 4 thereof). It is arranged to turn on whenever any one of the resultant impulses developed by the OR unit 30 persists for approximately 4 milliseconds and to remain on, following every turn-on incident, for approximately 9 milliseconds (slightly longer than the duration of one-half a power-frequency cycle, on a 60 c.p.s basis). Accordingly, the measuring component 31 operates about 4 milliseconds after a supervising signal is applied to terminal 20 to produce a continuous output if zero-phase-sequence line current is flowing in the given direction. This output appears at a terminal 38*a* and comprises the "stopping signal" of the ground fault responsive directional-comparison protective relaying system illustrated in the aforesaid copending application.

Consideration will now be given to the associated time delay means T.D., the preferred embodiment of which in FIG. 1 is shown within the broken-line enclosure identified by the reference character "T.D." This time delay means includes the measuring component 34 which is energized by the output of the AND unit 32 of the coincidence circuit 29. This output commences when a supervising signal is applied to terminal 20 and comprises a succession of substantially constant magnitude positive voltage blocks coinciding in duration to the above-defined "negative" half cycles of the A.-C. operating signal derived from the operating quantity which energizes terminals 12*a* and 12*b*. As is indicated in FIG. 1, another measuring component 35 in T.D. is fed from a terminal $2e$ energized by a similar output of the companion coincidence circuit 28, which output commences when the supervising signal is applied to terminal 20 and comprises a succession of substantially constant magnitude positive voltage blocks corresponding to the opposite-polarity or "positive" half cycles of the operating signal. The measuring components 34 and 35 in turn are disposed to provide alternative input signals for an OR logic unit 36.

The two measuring components 34 and 35, identical in construction, are each shown in FIG. 1 as a block labeled "T4" which preferably comprises a circuit like that of the measuring component 31 referred to above. Each component 34, 35 is arranged to operate (turn on) when keyed by an input voltage block which has persisted for at least a predetermined first interval of time (such as 4 milliseconds) and to remain in operation for at least 9 milliseconds thereafter. Each measuring component while operating energizes, by way of the OR unit 36, a common timing component 37 which is shown in FIG. 1 as a block labeled "T5."

The timing component 37, preferably comprising a circuit such as that shown and described in the aforesaid copending application S.N. 249,791, Mathews (see FIG. 5 thereof), is arranged to turn on when continuously energized by either 34 or 35 for a second interval of time (such as 2 milliseconds), and subsequently to turn off in substantially instantaneous response to said energization being suspended. When on, the output of this component is applied to a terminal $38b$ and comprises the "first coordinating signal" of the ground fault responsive directional-comparison protective relaying system which is illustrated in the aforesaid copending application. As is fully explained in the copending application, the first coordinating signal cannot be produced if the operating quantity which energizes GD has a frequency higher than a predetermined amount (e.g. 120 c.p.s.), and this characteristic of the operation of T.D. is utilized to accomplish a desired frequency checking function.

Figure 2:
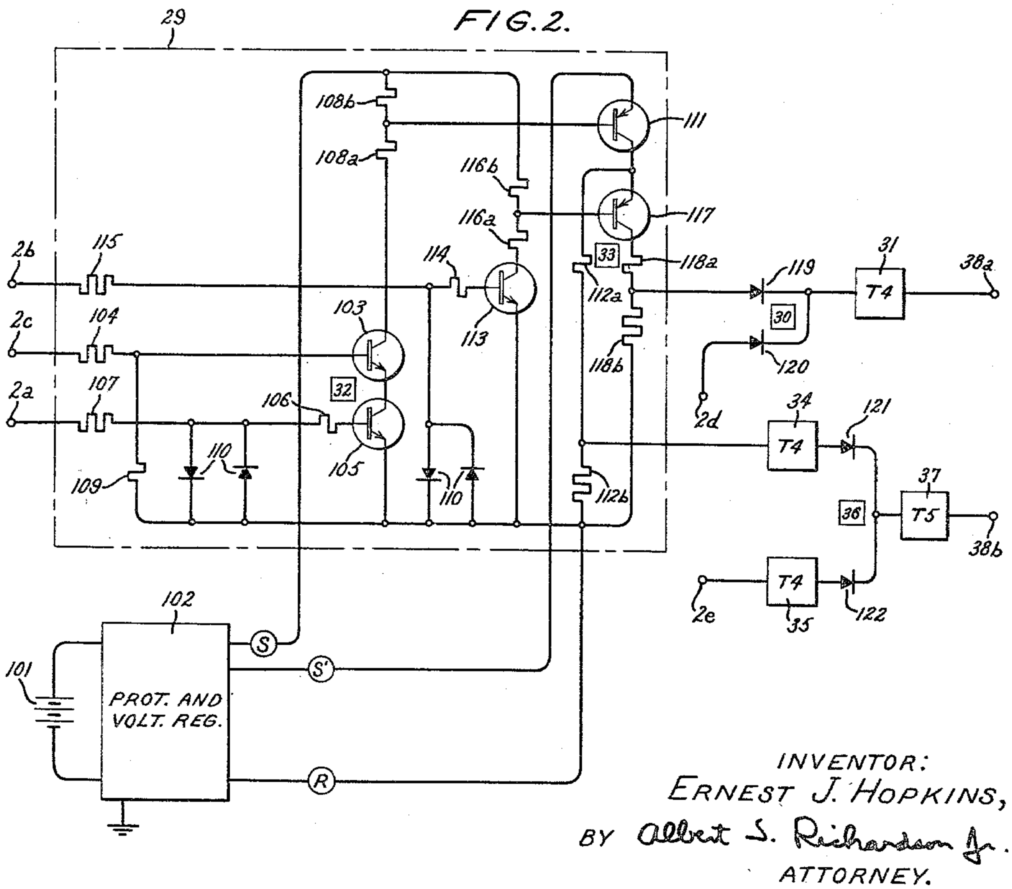
FIG. 2 is a circuit diagram of the logic units of my invention which are encompassed in FIG. 1 by dash-line 2 and FIGS. 3A and 3B are amplitude-time charts of typical signals applied to and produced by the logic circuits shown in FIG. 2 under two different operating conditions.

Having now described with reference to FIG. 1 the respective operations of the logic units and related components comprising GD and T.D. as illustrated therein, consideration will next be given to a diagram revealing in greater detail the circuits of those units and components which in FIG. 1 are encompassed by the dash-line 2. The circuit diagram referred to is set forth in FIG. 2, and a description of it is presented below. The coincidence circuit 29 of my invention, as it is shown in FIG. 2, receives a continuous supervising signal from terminal $2c$, a periodic operating voltage from terminal $2a$ and a periodic reference voltage from terminal $2b$. It also receives control power from a source of regulated D.-C. supply voltage which comprises, for example, a battery 101 having connected thereto suitable protection and regulating means 102. For the sake of drawing simplicity, I have used the encircled letters R and S to represent, respectively, a common reference terminal or bus (energized from the negative terminal of the battery 101) and a supply voltage terminal or bus of positive polarity relative to the reference bus. The magnitude of the supply voltage is preferably about 20 volts. For convenience I also derive from this source a positive bias bus, represented by the encircled terminal S', which has a level of bias potential slightly less positive than the supply voltage bus S.

As can be seen in FIG. 2, the coincidence circuit 29 includes an NPN transistor 103. The base electrode of this transistor is connected by way of a current limiting resistor 104 to the terminal $2c$ for energization by the supervising signal. The supervising signal when present comprises a continuous D.-C. voltage that is positive relative to the reference bus and has a magnitude nearly equal to the magnitude of the supply voltage. The base electrode of another NPN transistor 105, which is disposed in tandem with transistor 103, is connected through a pair of resistors 106 and 107 to the terminal $2a$ for energization by the operating voltage which is representative of alternative half cycles of zero-phase-sequence line current. This operating voltage comprises periodic impulses or half cycles of positive polarity relative to the reference bus.

The transistors 103 and 105 comprise the AND logic unit 32 of the coincidence circuit 29. As is shown in FIG. 2, the emitter of transistor 105 is connected directly to the reference bus R. The collector of transistor 105 and the emitter of transistor 103 are interconnected as shown. The collector of transistor 103 is connected to the supply voltage bus S by way of a load impedance comprising a pair of resistors $108a$ and $108b$ in series. A base resistor 109 is connected between the base electrode of transistor 103 and the reference bus, while two oppositely poled voltage limiting diodes 110 are connected in parallel relationship between reference bus and the junction of resistors 106 and 107. Each of the pair of diodes 110 selected has an inherent forward voltage drop greater than the base-to-emitter voltage of transistor 105 when conducting.

The AND unit 32 is turned on only when both of the transistors 103 and 105 are rendered conductive. So long as either one of these transistors is in a non-conductive state (inactive), no current or appreciable magnitude can flow in the load impedance and hence there is negligible voltage drop across resistor 108b. But whenever both transistors are concurrently active, their serially connected emitter-collector circuits readily conduct load current and the junction between resistors $108a$ and $108b$ becomes appreciably negative, with respect to the supply voltage bus S. This junction is connected to the base electrode of a normally inactive PNP transistor 111 whose emitter is connected directly to the positive bias bus S' and whose collector is connected through two voltage dividing resistors $112a$ and $112b$ to the reference bus R, the latter resistor having a much greater resistance value than the former. A portion of the load current conducted jointly by the transistors 103 and 105 will follow a path through the emitter-base junction of transistor 111, thereby activating the same, and the latter transistor is turned on simultaneously with the AND unit 32. Whenever this inverting transistor 111 is turned on, its collector current produces across resistor $112b$ a positive output voltage of substantially constant magnitude nearly equal to the magnitude of the supply voltage.

It is apparent in FIG. 2 that in order for both transistors 103 and 105 to be active, their base electrodes must simultaneously be energized by the suppervising signal received from terminal $2c$ and by the operating voltage which periodically energizes terminal $2a$, respectively. Whenever the instantaneous magnitude of operating voltage exceeds the relatively low threshold level required to effect forward current flow in the emitter-base junction of transistor 105 (for example, approximately 0.15 volt for a germanium transistor), this transistor is active. However, no significant amount of load current can flow unless the transistor 103 is also forward biased in response to the application of a supervising voltage signal to the terminal $2c$. (In practice the supervising signal is applied whenever the operating signal exceeds a predetermined critical level, such as 3 volts R.M.S.) It is only during the periods of concurrent activation of both of the transistors 103 and 105 that the associated inverting transistor 111 is active, and therefore the output voltage taken from resistor $112b$ comprises a succession of voltage blocks (of positive polarity with respect to the reference bus R) coinciding in duration to the positive half cycles of the A.-C. operating signal applied to the input terminal $2a$ while the supervising signal is present.

My coincidence circuit 29, as is shown in FIG. 2, includes yet another NPN transistor 113. The base electrode of transistor 113 is connected through a pair of resistors 114 and 115 to the terminal $2b$ for energization by the reference voltage which is representative of alternate half cycles of the zero-phase-sequence polarizing quantity. The reference voltage comprises periodic impulses or half cycles of positive polarity relative to the reference bus R. The emitter of the transistor 113 is connected directly to the reference bus, while the collector is connected to the supply voltage bus S through a load impedance comprising a pair of resistors **116*a* and 116*b* in series. Another parallel pair of oppositely pooled voltage limiting diodes 110 is connected between the reference bus and the junction of resistors 114 and 115**.

So long as transistor 113 is in a non-conductive state (inactive), no current of appreciable magnitude can flow in the load impedance and hence there is negligible voltage drop across resistor **116*b*. But whenever this transistor is active, its emitter-collector circuit readily conducts load current and the junction between resistors 116*a* and 116*b* becomes appreciably negative, with respect to the supply voltage bus S. This junction is connected to the base electrode of a normally inactive PNP transistor 117 whose emitter is connected to the collector of the transistor 111 and whose collector is connected through two voltage dividing resistors 118*a* and 118*b* to the reference bus R, the latter resistor having a much larger resistance value than the former. Activation of the transistor 113 will thus cause forward bias of this inverting transistor 117**.

The transistors 111 and 117 in tandem comprise the AND logic unit 33 of the coincidence circuit 29 of my invention. The output signal of this unit comprises the positive voltage developed across resistor **118*b* when both transistors are concurrently active. So long as either transistor 111 or transistor 117 is in a non-conductive state (inactive), no current of appreciable magnitude can flow in the resistor 118*b* and hence the level of potential at the junction between the voltage dividing resistors 118*a* and 118*b* is substantially the same as that of the reference bus R. But whenever both of these transistors are on at the same time, their serially connected emitter-collector circuits readily conduct load current which produces across resistor 118*b*** an output voltage of positive polarity with respect to the reference bus and of substantially constant magnitude nearly equal to the magnitude of the supply voltage.

It is apparent in FIG. 2 that in order for both of the transistors 111 and 117 to be active, the AND unit 32 must be turned on and the transistor 113 must concurrently be conductive. The latter transistor periodically is rendered conductive in response to the enrgization of input terminal **2*b* by reference voltage having an instantanous magnitude in excess of the relatively low threshold level (approximately 0.15 volt, for example) required to effect forward current flow in its emitter-base junction, and at this time transistor 117 is forward biased. However, no significant amount of collector current can be conducted by transistor 117 unless at the same time the emitter-base junction of the companion transistor 111 is forward biased as a result of the simultaneous activation of the two transistors 103 and 105 comprising the AND unit 32. This occurs, as explained above, throughout the periods of concurrent energization of terminal 2*a* by the operating voltage and terminal 2*c*** by a supervising signal.

Figures 3A, 3B:
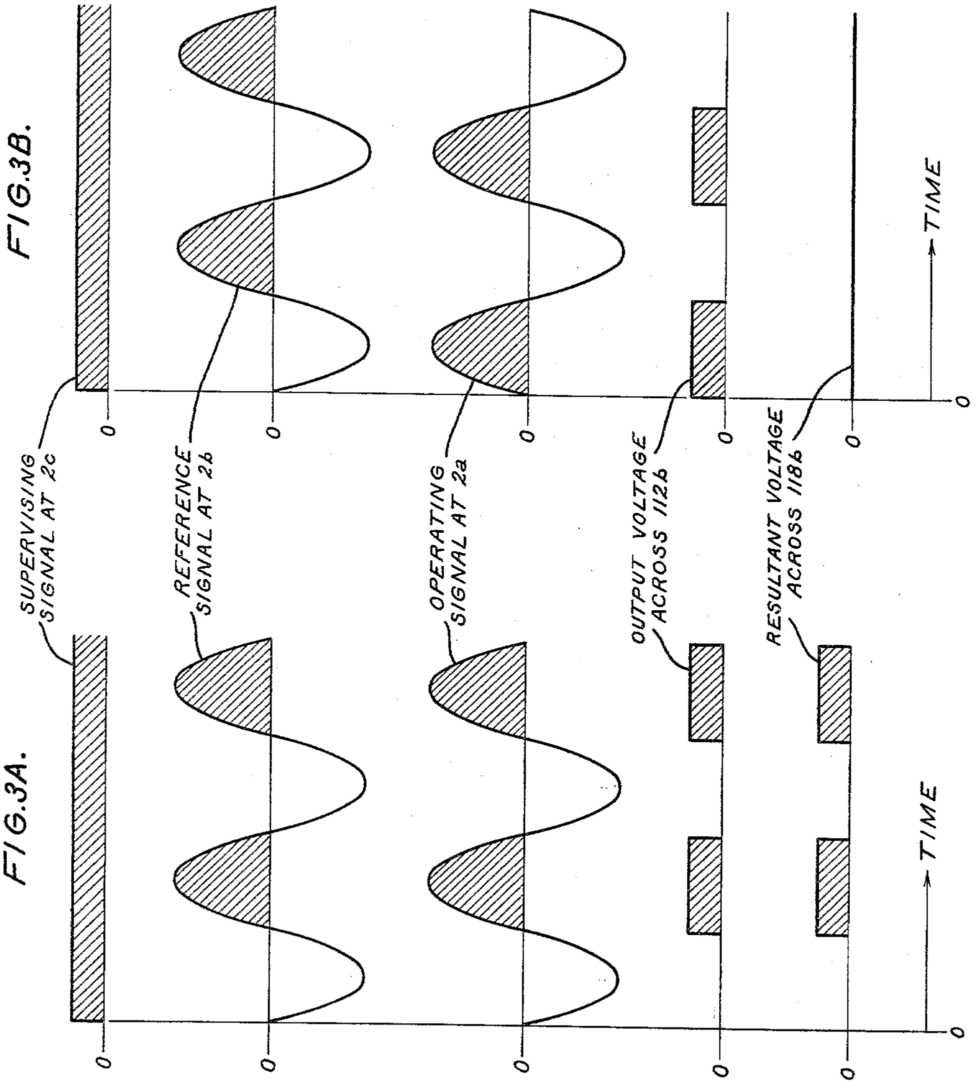

Consequently, so long as a supervising signal is present, my conincidence circuit 29 is operative to produce resultant voltage across resistor **118*b* during that portion of every power-frequency cycle when the operating and reference A.-C. signals applied respectively to the input terminals 2*a* and 2*b* are simultaneously positive (with respect to the supply voltage reference bus R). The duration of this resultant voltage signal during each cycle will therefore indicate the phase relationship between the operating and reference input signals, whereby it provides a measure of the phase angle between zero-phase-sequence line current and the zero-phase-sequence polarizing quantity. It should be noted here that although the operating and reference signals which are applied to the input terminals 2*a* and 2*b* of the coincidence circuit in its contemplated setting, when a coincidence detecting operation of this circuit is required, will typically have values of 60 volts R.M.S. or higher. I have arranged this circuit for highly sensitive response to its input signals (both of the transistors 105 and 113 operatively responding at very low instantaneous magnitudes of the inputs which are supplied respectively thereto), so as to enable it to provide a measure of phase angle which remains very accurate at the relatively low R.M.S. values of these A.-C. signals sometimes expected. The waveform of the resultant voltage developed across resistor 118*b* has been illustrated in FIG. 3A for an in-phase condition of the operating and reference signals that are applied to the input terminals 2*a* and 2*b*, respectively. The waveform of the output voltage developed across resistor 112*b* is also depicted. The respective magnitudes of the various signals shown in FIG. 3A, which magnitudes are measured with respect to zero lines corresponding to the potential of the common reference bus R, are not intended to be to scale. The duration of the resultant voltage across resistor 118*b*** during each operating signal cycle would be shorter than that shown in FIG. 3A if the phase of the operating signal were displaced with respect to that of the reference signal, and as is indicated in FIG. 3B no resultant voltage is developed when these two signals are exactly 180 degrees out-of-phase.

The resultant voltage impulses produced by the coincidence circuit 29 in the above-described manner are used to energize the measuring means or component 31 of the directional sensing means GD. Toward this end, as can be seen in FIG. 2, the junction between the voltage dividing resistors **118*a* and 118*b* is connected by way of a diode 119 to the component 31. The diode 119 comprises one element of the OR logic unit 30 which includes another identical element or diode 120. The latter diode interconnects component 31 and the terminal 2*d* which is energized, as indicated in FIG. 1, by the resultant voltage impulses alternatively produced by the opposite-polarity coincidence circuit 28. Consequently, the measuring component 31** is energized by a train of resultant voltage impulses having periods of duration dependent upon the periods of polarity coincidence between the operating and polarizing A.-C. quantities during successive half cycles thereof.

The function of the measuring component 31 is to effect operation of the directional sensing means GD when energized by any resultant voltage impulse which persists for approximately as long as 4 milliseconds. Resultant impulses of such duration, as has been mentioned hereinbefore, are produced only if zero-phase-sequence line current is flowing as though to a ground fault located on the protected line. The component 31, represented in FIG. 2 by the block labeled T4, is a time delay pickup and dropout circuit of appropriate design, such as the T4 circuit fully disclosed in the aforesaid copending patent application S.N. 249,791, Mathews, and its operation causes energization of terminal **38*a*** by a signal suitable for predetermined control purposes.

The time delay means T.D. in FIG. 2 has been illustrated in essentially the same manner as in the previously described FIG. 1, with a pair of diodes 121 and 122 being shown for the OR logic unit 36. Its measuring component 34 is connected to the junction between resistors **112*a* and 112*b* for energization by the output voltage which is produced across resistor 112*b* whenever the AND unit 32 in the coincidence circuit 29 is turned on, this energization being in the form of successive blocks of positive voltage subsisting during operating signal half cycles of given polarity. The other measuring component 35 is connected to terminal 2*e* for energization by a similar succession of positive voltage blocks derived by the companion coincidence circuit 28** during operating signal half cycles of opposite polarity. Both of the components 34 and 35, as explained hereinbefore, are time delay pickup and dropout devices, and preferably each comprises a T4 circuit similar to the measuring component 31.

Each of the measuring components 34 and 35 is operative to produce an output signal, after a minimum initial delay of 4 milliseconds, when it is keyed by the energizing voltage blocks provided by my coincidence circuit in response to an operating signal of power frequency (60 c.p.s.). The respective output signals are channeled through diodes 121 and 122 to a common timing component 37 which is energized thereby. The timing component 37 is arranged to turn on when a definite interval of 2 milliseconds has elapsed following the delayed operation of whichever measuring component (34 or 35) operates first, whereby the minimum interval of time required to produce a coordinating signal at terminal 38*b* will be 6 milliseconds, measured from the moment that the AND unit 32 turns on. The component 37, represented in FIG. 2 by the block labeled T5, is a time delay pickup and instantaneous dropout circuit such as the T5 circuit described in the copending Mathews application.

While I have shown and described a preferred form of my invention by way of illustration, various modifications will occur to those skilled in the art. I contemplate, therefore, by the claims which conclude this specification to cover all such modifications as fall within the true spirit and scope of my invention.

What I claim as new and desire to secure by Letters Patent of the United States is:

1. In a transistor logic circuit:

(a) a source of D.-C. supply voltage comprising a reference terminal and a second terminal adapted to be energized by supply voltage of predetermined polarity relative to the reference terminal;

(b) first and second transistors each having a collector, emitter and base electrode and each having emitter-base and collector-base junctions.

(c) the emitter-collector circuit of the first transistor being connected between said terminals, in series with means for developing with respect to said reference terminal a first output voltage of said predetermined polarity upon activation of said first transistor;

(d) means connected in circuit with the emitter-base junction of the first transistor for maintaining the first transistor in a normally inactive state;

(e) the emitter-collector circuit of the second transistor being connected between said terminals, in series with the emitter-collector circuit of the first transistor and with means for developing with respect to said reference terminal a second output voltage of said predetermined polarity only in response to the concurrent activation of said first and second transistors;

(f) first and second impedance means;

(g) third and fourth transistors each having a collector, emitter and base electrode and each having emitter-base and collector-base junctions, said first impedance means and the emitter-collector circuits of the third and fourth transistors being serially interconnected between said terminals with the emitter of the fourth transistor connected directly to said reference terminal;

(h) means connecting said first impedance means to said first transistor for effecting forward current flow in the emitter-base junction of the first transistor, thereby activating the first transistor, only in response to the concurrent activation of said third and fourth transistors;

(i) a fifth transistor having a collector, emitter and base electrode and having emitter-base and collector-base junctions, said second impedance means and the emitter-collector circuit of the fifth transistor being serially interconnected between said terminals with the emitter circuit of the fifth transistor connected directly to the reference terminal;

(j) said second impedance means and said second transistor being interconnected in a manner to cause forward bias of the second transistor in response to activation of said fifth transistor;

(k) first, second and third input terminals;

(l) first circuit means, including the first input terminal and the emittter-base junction of said third transistor, for causing forward bias of the third transistor in response to the application of a predetermined supervising signal to the first input terminal;

(m) second circuit means, including the second input terminal and the emitter-base junction of said fourth transistor, for effecting forward current flow in the emitter-base junction of the fourth transistor, thereby activating the fourth transistor, in response to said second input terminal being energized by a voltage of said predetermined polarity relative to said reference terminal; and (n) third circuit means, including the third input terminal and the emitter base junction of said fifth transistor, for effecting forward current flow in the emitter-base junction of the fifth transistor, thereby activating the fifth transistor, in response to said third input terminal being energized by a voltage of said predetermined polarity relative to said reference terminal.

2. The transistor logic circuit of claim 1 in which said predetermined polarity is positive, said first and second transistors are of the PNP type, and said third, fourth and fifth transistors are of the NPN type.

3. In a transistor logic circuit:

(a) a pair of D.-C. supply voltage terminals;

(b) first and second transistors each having a collector, emitter and base electrode and each having emitter-base and collector-base junctions;

(c) the emitter-collector circuit of the first transistor being connected between said terminals in series with means for developing a first output signal upon activation of said first transistor;

(d) the emitter-collector circuit of the second transistor being connected between said terminals in series with the emitter-collector circuit of the first transistor and with means for developing a second output signal only in response to the concurrent activation of said first and second transistors;

(e) first and second impedance means;

(f) third and fourth transistors each having a collector, emitter and base electrode and each having emitter-base and collector-base junctions, said first impedance means and the emitter-collector circuits of the third and fourth transistors being serially interconnected between said terminals;

(g) means connecting said first impedance means to said first transistor for effecting forward current flow in the emitter-base junction of the first transistor, thereby activating the first transistor, only in response to the concurrent activation of said third and fourth transistors;

(h) a fifth transistor having a collector, emitter and base electrode and having emitter-base and collector-base junctions, said second impedance means and the emitter-collector circuit of the fifth transistor being serially interconnected between said terminals;

(i) said second impedance means and said second transistor being interconnected in a manner to cause forward bias of the second transistor in response to activation of said fifth transistor;

(j) first, second and third input terminals;

(k) first circuit means, including the first input terminal and the emitter-base junction of said third transistor, for causing forward bias of the third transistor in response to the application of a predetermined supervising voltage to the first input terminal;

(l) second circuit means, including the second input terminal and the emitter-base junction of said fourth transistor, for effecting forward current flow in the emitter-base junction of the fourth transistor, thereby activating the fourth transistor, in response to said second input terminal being energized by a predetermined operating voltage; and (m) third circuit means including the third input terminal and the emitter-base junction of said fifth transistor for effecting forward current flow in the emitter-base junction of the fifth transistor, thereby activating the fifth transistor, in response to said third input terminal being energized by a predetermined reference voltage.

4. The transistor logic circuit of claim 3 in which the emitters of said fourth and fifth transistors are both connected directly to a predetermined one of the supply voltage terminals, the second circuit means includes a first pair of parallel-connected oppositely poled diodes connected in parallel relationship with the emitter-base junction of said fourth transistor, and the third circuit means includes a second pair of parallel-connected oppositely poled diodes connected in parallel relationship with the emitter-base junction of said fifth transistor.

References Cited by the Examiner

UNITED STATES PATENTS

| | | | |
|---|---|---|---|
| 2,950,461 | 8/60 | Tryon | 307—88.5 |
| 2,973,437 | 2/61 | Bradley et al. | 307—88.5 |

ARTHUR GAUSS, *Primary Examiner.*